May 19, 1964 M. J. PALLADINO 3,133,987

COLOR TELEVISION DEMODULATION NETWORK

Filed Nov. 13, 1962 3 Sheets-Sheet 1

INVENTOR:
MICHAEL J. PALLADINO,

BY Frank J. Thompson
HIS ATTORNEY.

COLOR TELEVISION DEMODULATION NETWORK

Filed Nov. 13, 1962 3 Sheets-Sheet 2

INVENTOR:
MICHAEL J. PALLADINO,
BY Frank J. Thompson
HIS ATTORNEY.

INVENTOR:
MICHAEL J. PALLADINO,
BY *Frank J. Thompson*
HIS ATTORNEY.

United States Patent Office 3,133,987
Patented May 19, 1964

3,133,987

COLOR TELEVISION DEMODULATION NETWORK

Michael J. Palladino, North Syracuse, N.Y., assignor to General Electric Company, a corporation of New York Filed Nov. 13, 1962, Ser. No. 237,136
5 Claims. (Cl. 178—5.4)

Figure 1:
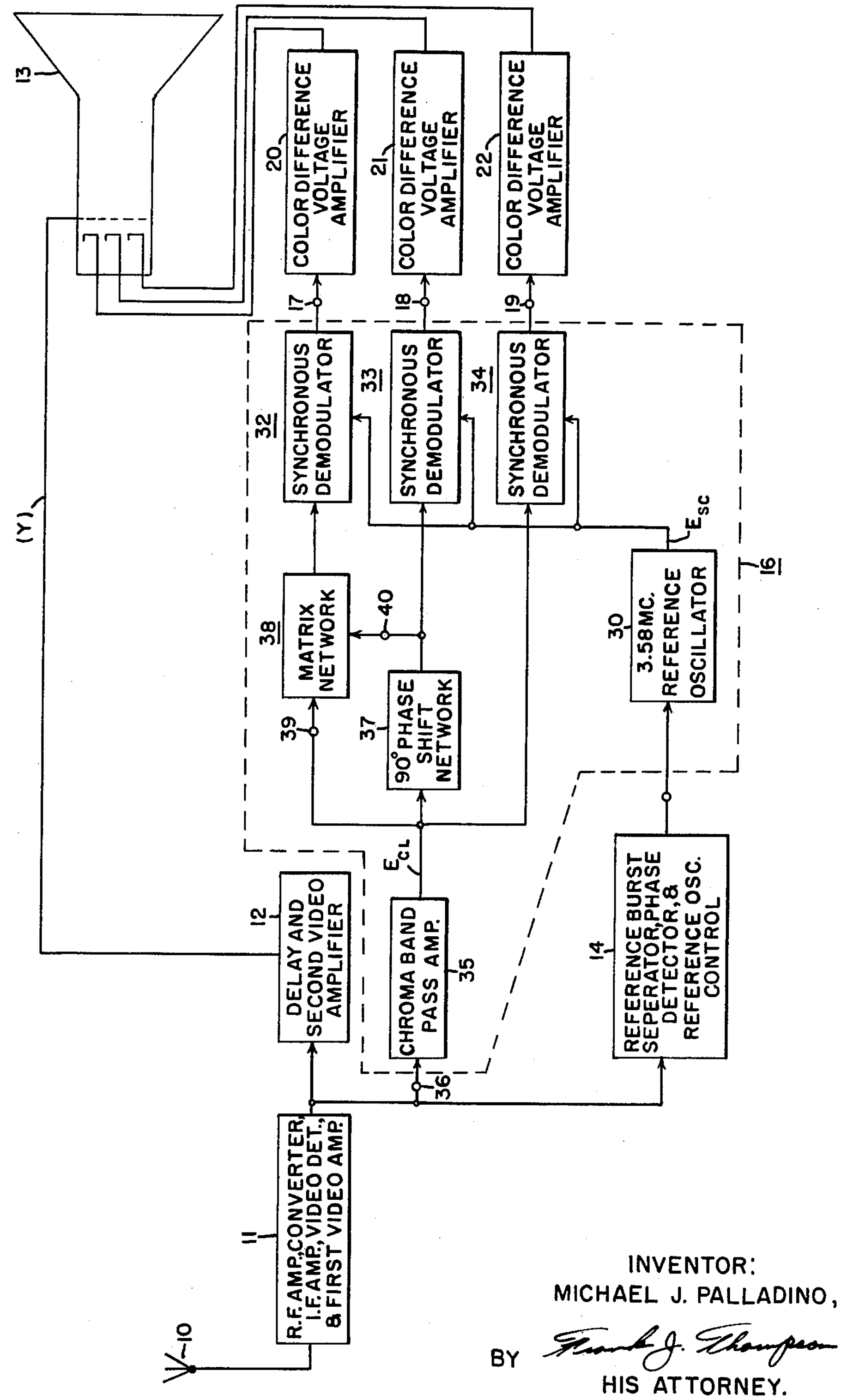

This invention relates to a color-difference voltage demodulation network for an equiband color television receiver.

The advantages derived from providing a color television receiver having a color-difference demodulation network which includes three synchronous demodulator circuits for separately deriving $(R-Y)$, $(B-Y)$, and $(G-Y)$ color difference voltages from a chrominance voltage are well known in the art. Input voltages to each demodulator circuit comprise a reference voltage of subcarrier frequency, $E_{sc}$, and a chrominance voltage, $E_c$, both of which are relatively phased for synchronously demodulating a desired color-difference voltage.

It is desirable to reduce the number of tuned circuits and consequently increase the gain of a narrow band subcarrier channel which provides the reference voltage, $E_{sc}$, for the receiver. In so doing, it has been proposed to supply to each of the three demodulator circuits both a reference voltage, $E_{sc}$, having a common phase $\theta$, which is measured with respect to the phase of a received burst voltage $E_b$, and a chrominance input voltage, $E_c$, having a color-difference component to be demodulated which is in-phase with the reference voltage $E_{sc}$.

One demodulation network of the type referred to for use in an I-Q type color television receiver is known wherein circuit means provide two chrominance voltages of different bandwidths. These chrominance voltages are phase shifted and matrixed to produce three additional chrominance voltages having associated color-difference voltage components which are in-phase with a subcarrier voltage at an associated synchronous demodulator circuit. A known arrangement for performing these functions adds complexity to a chrominance section of the receiver in that accurately proportioned inductances are utilized for providing both the necessary phase shift and the matrixing for producing each of the three additional chrominance voltages. Further, one of the three additional chrominance voltages is significantly attenuated during the matrixing operation. This circuit arrangement is thus more suitable for use with synchronous demodulator circuits employing multigrid amplifying devices wherein voltage gain is provided rather than with a significantly less costly balanced diode synchronous demodulator circuit.

In a color television receiver of the equiband type wherein color information components of a chrominance voltage are processed with equal bandwidth through a demodulation network and through subsequent sections of the receiver, cost is of primary importance. The described demodulation network for the I-Q type receiver is prohibitively expensive and therefore not desirable for use in an equiband television receiver.

Accordingly, it is an object of this invention to provide an improved demodulation network for separately demodulating three color-difference voltages in an equiband color television receiver.

Another object of this invention is to provide relatively economical means for separately demodulating three color-difference voltages in an equiband color television receiver.

A further object of this invention is to provide a color-difference voltage demodulation network for an equiband color television receiver wherein a subcarrier reference voltage which is in-phase with one of two quadrature related color-difference components of a chrominance voltage or a complement thereof may be utilized for synchronously demodulating a third color-difference component of the chrominance voltage.

These and other objects are accomplished in accordance with the present invention in the following manner. A color-difference voltage demodulation network for an equiband color television receiver is provided for demodulating first and second quadrature phase related color-difference components of a chrominance voltage and for demodulating a third color-difference component. The demodulation network includes first, second, and third synchronous demodulation circuits, a source of chrominance voltage comprising a chrominance voltage band-pass amplifier, and a source of synchronized reference voltage of subcarrier frequency having phase coherence with the phase of one of the quadrature related color-difference components or a complement thereof. Circuit means including a phase shift network are provided for coupling the chrominance and the reference voltages from their respective sources to the first and second synchronous demodulator circuits in a manner for providing properly phased input voltages for causing demodulation of the first and second quadrature related color-difference components of the chrominance voltage. Circuit means, including the referred to phase shift network and a resistive matrix network, derive from the chrominance voltage source and couple to the third synchronous demodulator circuit a chrominance voltage having a third color-difference component which is phase coherent with a subcarrier voltage or a complement thereof existing at a one of the first and second demodulator circuits. Circuit means are also provided for coupling from said one of the first and second demodulator circuits to the third synchronous demodulator circuit a subcarrier voltage or complement thereof.

Figure 2:
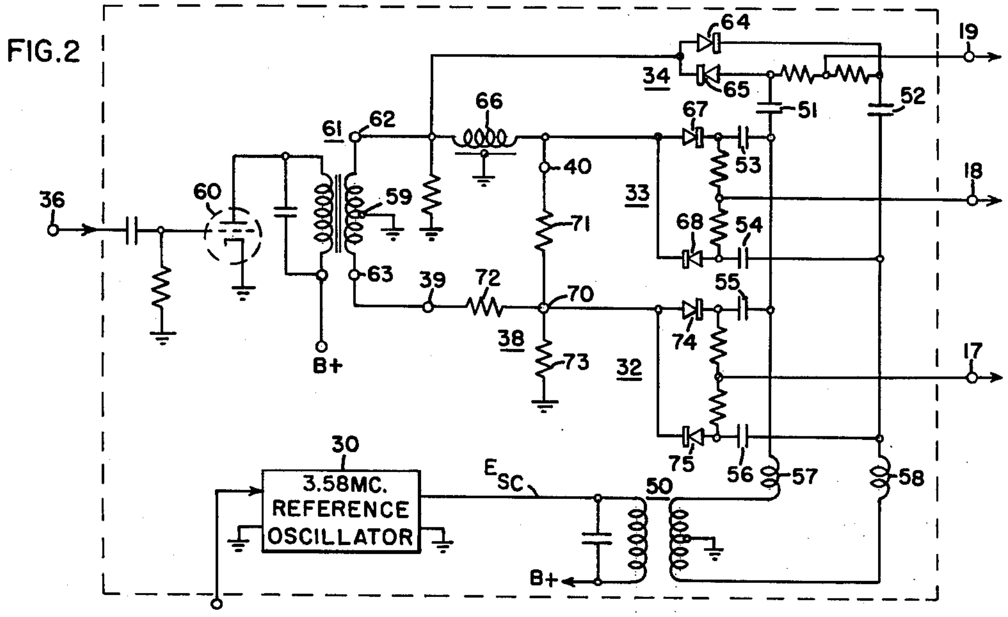
Figure 3:
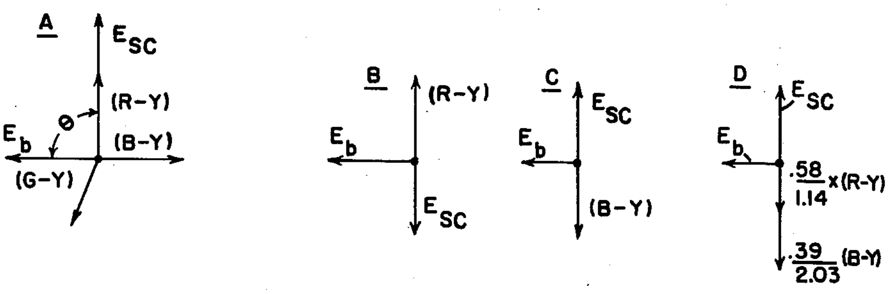
Figure 4:
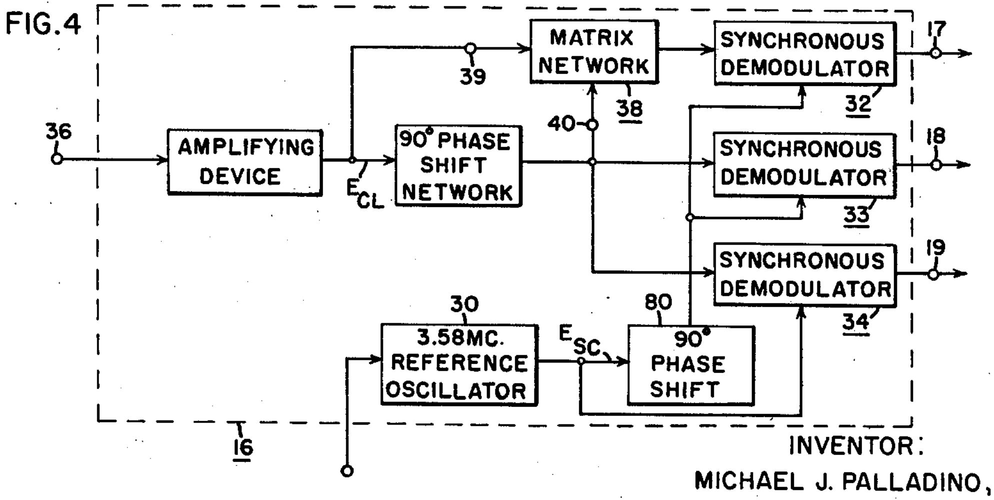
Figure 5:
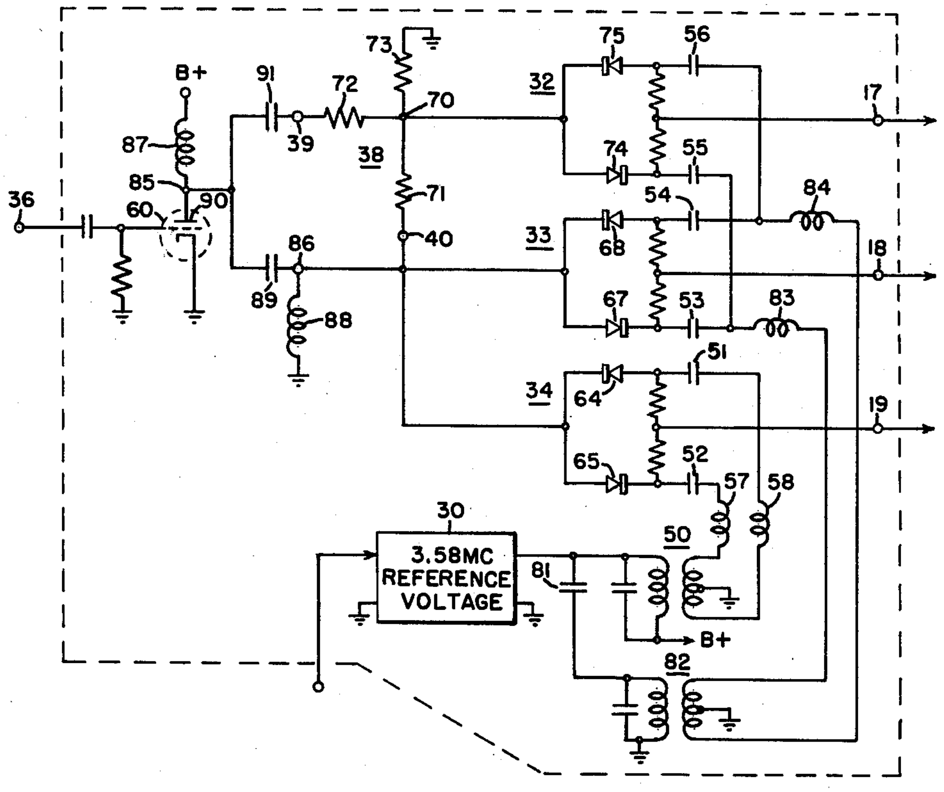
Figure 6:
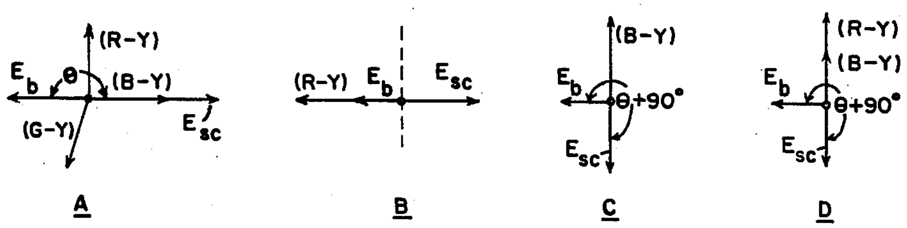

Further objects, features, and the attending advantages of the present invention will be apparent with reference to the following specification and drawings in which:

FIGURE 1 is a block diagram of an equiband color television receiver illustrating one embodiment of the present invention, FIGURE 2 is a circuit diagram of one circuit arrangement of the embodiment of the invention illustrated in FIGURE 1, FIGURE 3 is a diagram illustrating various phase relations existing between voltages occurring in the diagrams of FIGURES 1 and 2, FIGURE 4 is a block diagram illustrating an alternative embodiment of the present invention, FIGURE 5 is a circuit diagram of one circuit arrangement of the embodiment of the invention illustrated in FIGURE 4, and FIGURE 6 is a diagram illustrating the phase relations of the various voltages occurring in the diagrams of FIGURES 4 and 5.

Reference is now made to FIGURE 1 for a general description of an equiband color television receiver utilizing one embodiment of the present invention. The general arrangement and operation of color television receivers is well known in the art and accordingly only those sections of a color television receiver are included in FIGURE 1 which are believed necessary for an understanding of the present invention. A composite color television signal is induced in an antenna 10 and amplified by a radio frequency amplifier, converted to an intermediate frequency, further amplified by an intermediate frequency amplifier, detected and amplified by a first video amplifier. These functions are conventional and means for performing them are indicated generally by the block 11. An output voltage from the first video amplifier of block 11 comprises a composite video color signal which includes a luminance voltage component $E_y$, a chrominance voltage component $E_c$, and a color synchronizing burst voltage comprising a few cycles of an alternating voltage of subcarrier frequency which is synchronized in phase and frequency with a subcarrier voltage at a television transmitter. This composite color video voltage is coupled to a delay and second video amplifier network indicated by the block 12. The luminance component, $E_y$, of the composite signal is amplified and coupled from the second video amplifier of network 12 to a control electrode of a tri-gun color cathode ray picture tube 13. The composite color television signal is also coupled to a chrominance section of the receiver which includes both a color synchronizing network 14 and a chrominance voltage demodulation network shown within dotted lines and indicated generally by the numeral 16. The color synchronizing network separates the burst voltage $E_b$ from the composite signal during the occurrence of a gating signal, not indicated in FIGURE 1; detects phase differences between the burst and a locally generated reference voltage and accordingly varies the phase of the locally generated voltage to cause a desired phase relation between the burst and subcarrier voltage to exist. As indicated previously this phase difference is referred to by the symbol $\theta$ and illustrated in FIGURES 3 and 6. The demodulation network 16, which is discussed in detail hereinafter, generates three color-difference voltages at output terminals 17, 18, and 19. These color-difference voltages are amplified by color-difference voltage amplifiers 20, 21 and 22 respectively and are coupled therefrom to cathode electrodes of the cathode ray picture tube 13.

In accordance with a feature of the present invention, the demodulation network 16 is arranged for providing synchronous demodulation of three color-difference components of a chrominance voltage $E_c$, two of which components are quadrature phase related, when a reference voltage, $E_{sc}$, having a phase $\theta$ is coupled to a common input terminal of the three demodulator circuits. The demodulation network 16 includes a source, 30, of reference voltage $E_{sc}$ of subcarrier frequency and phase $\theta$. The angle $\theta$ is chosen to provide phase coherence between $E_{sc}$ and a color-difference component $(R-Y)$, $(B-Y)$ or complement thereof. The term complement as used herein refers to a voltage having a 180° phase difference with the referred-to voltage. The reference voltage is coupled to each of three synchronous demodulator circuits 32, 33, and 34. A bandpass amplifier 35 is provided for both segregating and amplifying the chrominance component $E_c$ of the composite video signal which is coupled to an input terminal 36 of the network 16. In accordance with well known equiband color television receiver operation, the amplifier 35 limits the frequency of the chrominance voltage $E_c$ to a double sideband bandwidth of approximately one megacycle. This band limited chrominance voltage is hereinafter referred to as $E_{CL}$.

The amplified and band limited chrominance voltage $E_{CL}$ is coupled to the synchronous demodulator circuits in a manner for providing at each of these demodulators a voltage $E_{CL}$ having a desired color-difference component thereof which is phase coherent with the reference voltage $E_{sc}$ or a complement thereof at the associated demodulator. By selecting the phase angle $\theta$ of the reference voltage so that $E_{sc}$ is phase coherent with the $(R-Y)$ component or complement thereof, demodulation of the $(R-Y)$ or $-(R-Y)$ component may be simply effected by coupling the voltage $E_{CL}$ to the $(R-Y)$ synchronous detector 34. Since $E_{sc}$ is coherent with the $(R-Y)$ axis, demodulation of a $(B-Y)$ component of the chrominance voltage may be effected by delaying the voltage $E_{CL}$ by 90° to thereby rotate the $(B-Y)$ component into coherence with the reference voltage or complement thereof. For this purpose, a phase shift network 37 couples the voltage $E_{CL}$ to the $(B-Y)$ synchronous demodulator 33 while providing the desired 90° phase shift.

For demodulating a third color-difference component $(G-Y)$ which is not quadrature related to either of the components $(R-Y)$ and $(B-Y)$, a resistive matrix network 38 is provided for coupling, in cooperation with the phase shift network 37, the voltage $E_{CL}$ to the synchronous demodulator 32 in a manner for providing that the phase of the third color-difference component is in phase coherence with a voltage $E_{sc}$ or complement thereof at the demodulator 32. The voltage $E_{CL}$ is coupled to an input terminal 39 of the matrix from the bandpass amplifier while the voltage at the output of the phase shift network 37 is coupled to an input terminal 40. These voltages at terminals 39 and 40 represent the $(R-Y)$ and $(B-Y)$ components respectively, as previously indicated. The matrix network is arranged for combining these input voltages in accordance with the relation:

$$(G-Y)=-\frac{.58\ (R-Y)}{1.14}-\frac{.39\ (B-Y)}{2.03}$$

The demodulated color-difference voltages $(G-Y)$, $(B-Y)$ and $(R-Y)$ which exist at output terminals 17, 18, and 19 of demodulators 32, 33, and 34 respectively are subsequently coupled to amplifiers 20, 21 and 22 for amplification.

The embodiment of the invention illustrated by the block diagram of FIGURE 1 may be practiced with the circuit arrangement illustrated in FIGURE 2. In FIGURE 2 the synchronous demodulator circuits are shown to be of the diode balanced detector type. A single demodulator circuit includes a pair of diodes, a pair of load resistances, and a pair of coupling capacitors arranged as indicated in FIGURE 2 in a well known manner. The voltage $E_{sc}$ is coupled from the source 30 via a transformer 50, having a primary winding tuned to the subcarrier frequency and a balanced secondary winding, to electrodes of the demodulator circuit diodes by respective coupling capacitors 51–56. The capacitors 51–56, along with associated stray capacitance, are series resonated at the reference frequency by inductances 57 and 58. Thus, a 180° phase difference is provided in the voltage $E_{sc}$ between electrodes of different diodes in a same demodulator circuit. A bandpass amplifier includes a triode amplifying device 60 having a transformer load circuit 61 which includes a tuned primary winding and a balanced secondary output winding having terminals 62 and 63. A chrominance voltage $E_{CL}$ existing between terminals 62 and a grounded center tap 59 of the secondary winding is coupled both to electrodes of diodes 64 and 65 in the demodulator circuit 34, and, via a delay line 66, to electrodes of diodes 67 and 68 in the demodulator circuit 33. The delay line provides a desired 90° phase delay in the voltage $E_{CL}$. A junction 70 of a resistive matrix network comprising resistors 71, 72, and 73, which are proportioned in accordance with the relation given hereinbefore, is coupled to electrodes of diodes 74 and 75 of the demodulator circuit 32.

FIGURE 3A illustrates the phase relations existing between the reference voltage $E_{sc}$, the burst voltage $E_b$, and the color-difference components $(R-Y)$, $(B-Y)$ and $(G-Y)$ of the voltage $E_{CL}$ at terminal 62 of the load transformer 61. FIGURES 3B, 3C, and 3D indicate the phase relations of the desired color-difference component and the voltage $E_{sc}$ as they exist at electrodes of the diodes of demodulators 34, 33, and 32 respectively. Since amplifiers 20, 21, and 22 of FIGURE 1 provide phase inversion, it is desired to detect $-(R-Y)$, $-(B-Y)$, and $-(G-Y)$ and accordingly the color components are shown to differ in phase with the reference voltage by 180°.

An alternative embodiment of the present invention is illustrated in FIGURE 4. Only the demodulation network 16 of FIGURE 1 is shown and circuits performing functions similar to the circuits in the network 16 of FIGURE 1 are represented by the same numerals. In the network of FIGURE 4 a reference voltage $E_{sc}$ having a phase $\theta$ is provided and coupled to demodulator 34 while a voltage $E_{sc}$ having a phase $(\theta+90°)$ is also provided and coupled to demodulators 32 and 33. In FIGURE 4, a phase shift network 80 is provided for supplying a desired 90° phase shift to the voltage $E_{sc}$. In addition, the chrominance voltage $E_{CL}$ is coupled to each of the demodulator networks for providing demodulation of the desired color-difference component in conjunction with the dual phases of the voltage $E_{sc}$.

In the circuit arrangement of FIGURE 5, elements performing functions similar to above described elements of FIGURE 2 are represented by the same numerals. Quadrature phase shift of the reference voltage $E_{sc}$ is provided by a capacitor 81 which couples the reference voltage to a tuned primary winding of a transformer 82. A balanced secondary winding of the transformer 82 couples the reference voltage to electrodes of demodulator circuits 32 and 33 via inductances 83 and 84 which resonate with associated coupling capacitors and stray capacitance as previously described with relation to FIGURE 2. A bandpass amplifier having a top coupled $\pi$ filter includes input and output terminals 85 and 86, a first inductance 87, and a second inductance 88 and capacitor 89. Whereas in FIGURE 2 the chrominance voltage $E_{CL}$ existing at an output electrode comprising the anode 90 of triode 60 is delayed in phase by the phase shift network 37 prior to coupling to the demodulator 33, the voltage $E_{CL}$ across inductance 88 in FIGURE 5 leads the voltage $E_{CL}$ at the anode electrode 90 of triode 60. This leading voltage $E_{CL}$ existing across inductance 88 is coupled from the output terminal 86 to the demodulators 33 and 34 for demodulation of quadrature phase related color-components $(B-Y)$ and $(R-Y)$ in cooperation with the above referred to quadrature phase related input reference voltages. The leading voltage across inductance 88 is also coupled to an input terminal 40 of the resistive matrix 38, discussed previously with relation to FIGURE 2, while the voltage $E_{CL}$ at the anode electrode of triode 60 and filter input 85 is coupled to a terminal 39 by a capacitor 91 having a value of capacitance selected to provide relatively little phase shift.

FIGURE 6A illustrates the phase relations existing between the reference voltage $E_{sc}$, the burst voltage $E_b$, and the color-difference components of the voltage $E_{CL}$ at an anode electrode of triode 60 of FIGURE 5. FIGURES 6B, 6C, and 6D indicate the phase relations of the desired color-difference component and the voltage $E_{sc}$ as they exist at electrodes of the diodes of the demodulators 34, 33, and 32 respectively. In a manner similar to the arrangement of FIGURE 2, the demodulators of FIGURE 5 are arranged for providing $-(R-Y)$, $-(B-Y)$, and $-(G-Y)$ color-difference output voltages.

While I have illustrated and described and have pointed out certain novel features of my invention, it will be understood that various omissions, substitutions, and changes in the form and details of the system illustrated may be made by those skilled in the art without departing from the spirit of the invention and the scope of the claims.

What I claim as new and desire to secure by Letters Patent of the United States is:

1. A color-difference voltage demodulation network for an equiband color television receiver comprising: first, second, and third synchronous demodulator circuits; a single source of band limited chrominance voltage, said band limited chrominance voltage having first and second quadrature related color-difference components and a third color-difference component; a source of reference voltage of subcarrier frequency having phase coherence with one of said two quadrature related color-difference components or a complement thereof; means including a phase shift network for coupling said band limited chrominance voltage and said reference voltage to said first and second demodulator circuits for demodulation of said quadrature related color-difference components; a resistive matrix network having first and second input terminals and an output terminal; means coupling said band limited chrominance voltage from said source to said first matrix input terminal; means coupling a voltage from said phase shift network to said matrix second input terminal; said matrix network arranged for providing an output chrominance voltage at said output terminal having an amplitude which is proportional to the amplitude of said third color-difference component; and means coupling said output voltage from said matrix output terminal and said reference voltage from said source to said third demodulator circuit for demodulation of said third color-difference component.

2. A color-difference voltage demodulation network for an equiband color television receiver comprising: first, second, and third synchronous demodulator circuits; a single source of band limited chrominance voltage, said chrominance voltage having first and second quadrature phase related color-difference components and a third color-difference component; a source of reference voltage of subcarrier frequency having phase coherence with said first color-difference component or complement thereof; means coupling said chrominance voltage from said source to said first demodulator circuit, said latter coupling means providing zero phase shift; means, including a 90° phase shift network, for coupling said chrominance voltage from said source to said second demodulator circuit; a resistive matrix network having first and second input terminals and an output terminal; said matrix arranged for providing a chrominance voltage at said output terminal having an amplitude proportional to the amplitude of said third color-difference component; means coupling said chrominance voltage from said source to said first input terminal; means coupling a voltage from said phase shift network to said second input terminal; means coupling said matrix output terminal to said third demodulator circuit; and means coupling said reference voltage from said source to each of said demodulator circuits.

3. A color-difference voltage demodulation network for an equiband color television receiver comprising: first, second, and third balanced diode synchronous demodulator circuits; a single source of band limited chrominance voltage comprising a bandpass amplifier having a transformer, said transformer having first and second output terminals and a balanced secondary winding connected between said output terminals; said chrominance voltage having first and second quadrature phase related color-difference components and a third color-difference component; a source of reference voltage of subcarrier frequency having phase coherence with said first color-difference component or its complement; means for coupling said chrominance voltage from said transformer first output terminal to said first diode demodulator circuit; said latter coupling means providing substantially zero phase shift; means coupling said chrominance voltage from said first terminal of said transformer to said second diode demodulator circuit; said latter coupling means providing a 90° phase shift; a resistive matrix network having first and second input terminals and an output terminal; means coupling a chrominance voltage from said source to said first matrix input terminal; means coupling said matrix output terminal to said third demodulation network; and means coupling said reference voltage to each of said diode demodulation circuits for providing demodulated color-difference output voltages of the same polarity.

4. A color-difference voltage demodulation network for an equiband color television receiver comprising: first, second, and third synchronous demodulator circuits;

a single source of band limited chrominance voltage, said chrominance voltage having first and second quadrature phase related color-difference components and a third color-difference component; a source of reference voltage of subcarrier frequency having phase coherence with said second color-difference component or complement thereof; means including a 90° phase shift network coupling said chrominance voltage from said source to said first and second demodulator circuits; a resistive matrix network having first and second input terminals and an output terminal; said matrix network arranged for providing a chrominance voltage at said output terminal having an amplitude proportional to the amplitude of said third color-difference component; means coupling said chrominance voltage from said source to said first matrix input terminal; means coupling a voltage from said phase shift network to said second matrix input terminal; means coupling said matrix output terminal to said third demodulator circuit; means coupling said demodulator circuit and means including a 90° phase shift network coupling said reference voltage from said source to said second and third demodulator circuits.

5. A color-difference voltage demodulation network for an equiband color television receiver comprising: first, second, and third balanced diode synchronous demodulation circuits; a source of band limited chrominance voltage comprising a bandpass amplifier having an amplifying device including an output electrode, and a $\pi$ filter circuit coupled thereto, said filter circuit including input and output terminals, said filter arranged for providing a 90° phase shift in voltage between said input and output terminals; said chrominance voltage having first and second quadrature phase related color-difference components and a third color-difference component; a source of reference voltage of subcarrier frequency having phase coherence with said second color-difference component or complement thereof; a resistive matrix network having first and second input and an output terminal; said matrix network arranged for providing a chrominance voltage at said output terminal having an amplitude proportional to the amplitude of said third color-difference component; means coupling said filter input terminal to said first matrix input terminal; means coupling said filter output terminal to said second matrix input terminal, and said first and second demodulator circuits; means coupling said matrix output terminal to said third demodulator circuit; means coupling said reference voltage from said second to said first demodulator; and means including a 90° phase shift network coupling said reference voltage from said source to said second and third demodulator circuits.

No references cited.